United States Patent [19]

Blount

[11] 3,979,362

[45] Sept. 7, 1976

[54] PROCESS FOR THE PRODUCTION OF SILICO-AMINO COMPOUNDS AND THEIR CONDENSATION PRODUCTS

[76] Inventor: David H. Blount, 5450 Lea St., San Diego, Calif. 92105

[22] Filed: Mar. 17, 1975

[21] Appl. No.: 559,313

Related U.S. Application Data

[63] Continuation-in-part of Ser. No. 71,628, Sept. 11, 1970, abandoned.

[52] U.S. Cl. ............... 260/67.6 R; 260/395 B; 260/68; 260/69 R; 260/69 N; 260/69 F; 260/72 R; 260/72.5

[51] Int. Cl.² ............... C08G 12/26; C08K 3/34; C08G 12/04; C08G 12/08

[58] Field of Search ............ 260/68, 69 R, 72 R, 260/69 F, 67.6 R, 72.5, 69 N, 39 SB

[56] References Cited

UNITED STATES PATENTS

| | | | |
|---|---|---|---|
| 2,224,815 | 12/1940 | Glycofrides | 260/69 R |
| 2,514,268 | 7/1950 | Walter | 260/69 R |
| 3,336,249 | 8/1967 | Segro | 260/69 R |
| 3,655,565 | 4/1972 | McDonald | 260/39 SB |
| 3,714,085 | 1/1973 | Berstein et al. | 260/39 SB |
| 3,842,039 | 10/1974 | Vargiu et al. | 260/69 R |

*Primary Examiner*—Murray Tillman
*Assistant Examiner*—Thurman K. Page

[57] ABSTRACT

Silico-amino compounds are formed by the chemical reaction of silico-formic acid with amino compounds, and then by reacting the resultant compounds with an aldehyde, a condensation product is formed.

6 Claims, No Drawings

PROCESS FOR THE PRODUCTION OF SILICO-AMINO COMPOUNDS AND THEIR CONDENSATION PRODUCTS

This application is a continuation-in-part of application Ser. No. 71,628, filed Sept. 11, 1970, now abandoned.

SUMMARY OF THE INVENTION

This invention relates to a process for the production of silico-formic acid and their condensation products. The silico-formic acid (H.SiO.OH) is produced by reacting a dry alkaline earth metal silicate or a dry alkali metal silicate with a mineral acid or a hydrogen salt. There are other methods to produce silico-formic acid.

Various amino compounds may be used, such as urea, thiourea, melamine, aniline, guanidine, saccharin, propyl urea, butyl urea, benzene and toluene sulfonamides, ammeline, dicyandiamide, aliphatic diamines and other alkyl-substituted ureas.

Various aldehydes may be used, such as formaldehyde, acetaldehyde, butyraldehyde, chloral, acrolein, furfural and hexamethylene tetramine. The aldehyde ratio may vary from 1:1 to 3:1, depending on the methyol groups desired.

The chemical reaction between silico-formic acid and amino compounds may take place in a basic, neutral or acidic pH, but is enhanced by a basic or acidic pH and by heat. The acidic catalyst most commonly used is sodium hydrogen sulfate, but other acidic compounds may be used, such as sulfuric acid, hydrochloric acid, formic acid, acetic acid, tartartic acid, oxalic and aromatic sulfonic acid, acid salts, and acid esters, such as acid alkyl phosphates. The most common basic catalyst is sodium carbonate, but other basic compounds may be used, such as calcium hydroxide, sodium hydroxide, ammonia and alkanolamine.

The above catalysts may also be used to enhance the chemical reaction between silico-amino compounds and aldehydes.

The resin solutions may be converted to a fully hardened state by prolonged heating. Plasticizers may be used to improve flexability and adhesiveness. Latent catalysts may be used to catalyze the final conversion of the molding powder from the initial stages of resin formation to the infusible, insoluble product.

The ratio of silico-formic acid to amino compound may vary from 0.5:1 to 2:1. An excess amount of silico-formic acid may be used as a filler.

Silico-amino condensation products may also be formed by reacting the silico-amino compounds with acetones, furans, isocynates, epichlorohydrin and silicone. Silico-amino compounds may be copolymerized with unsaturated organic compounds.

The silico-amino condensation products produced in this invention may be used as molding powders, paints, varnishes, cast resins, adhesives, sealants, transparent films, coating resins, and in laminates.

The primary object of the present invention to produce silico-amino compounds and their condensation products. Another object is to produce new and useful silico-organic compounds. Still a further object is to produce useful molding powders. A further object is to produce aldehyde silico-amino resins which are readily soluble in organic solvents and which may be used as paints, varnishes, adhesives, films, coating resins and in laminates.

My invention will be illustrated in greater detail by the specific examples that follow, it being understood that these are merely illustrative of, and not limited to, procedures which may be used in the production of silico-amino compounds and their condensation products.

EXAMPLE I

Sodium metasilicate pentahydrate is gradually added to concentrated sulfuric acid in the ratio of 1:2 mols. The reaction is completed within 2-8 hours, forming silico-formic acid and sodium hydrogen sulfate. Urea is added to the above mixture in the ratio of 1 mol per mol of sodium metasilicate used. The mixture is agitated and then neutralized with sodium carbonate to a pH of 7-8. The mixture forms a solid mass in 1-2 hours. The solid mass is then heated to the melting point of 50°-70°C, and agitated for 10-20 minutes. The mixture is then washed with water to remove sodium sulfate, leaving a white granular compound, silico-urea ($H_2NCONHSiOH$).

The above silico-urea is added to an aqueous solution of formaldehyde in the ratio of 1:1 mols and then the pH is adjusted to pH 4-5 with dilute sulfuric acid. The silico-urea compound goes into solution. The solution is then heated to 70°-90°C for 20-30 minutes or until the desired viscosity is reached and a clear resin is formed. The formaldehyde silico-urea resin is soluble in acetic acid. The resin will soften on heating; the temperature at which it softens varies with the viscosity of the resin.

EXAMPLE II

A dry granular sodium metasilicate is mixed with sodium hydrogen sulfate in the ratio of 1-2 mols. In 2-5 minutes the reaction starts, and oxygen is evolved. Considerable heat is produced in the reaction. The reaction is completed in 1-8 hours and the mixture is washed with water to remove the sodium sulfate from the silico-formic acid. The white granular silico-formic acid is then air dried.

Silico-formic acid and urea are mixed in the ratio of 1:1 mols, then sodium carbonate is added to adjust the pH to 8-10. The mixture is then heated to the melting point of urea (135°-160°C), while agitating. The reaction is completed in 20-30 minutes, forming a white granular compound, silico-urea ($H_2NCONH.SiO.H$).

Silico-urea is added to an aqueous solution of formaldehyde in the ratio of 1:1 mol, then dilute sulfuric acid is added to adjust the pH to 4-5. The solution is then agitated, heated to 70°-90°C, and the silico-urea goes into solution. The reaction is completed in 20-30 minutes or until the desired viscosity is reached. The resin formed is white in color, softens with heat at 60°-70°C, and is soluble in acetic acid. When the acetic acid evaporates from the solution of aldehyde silico-urea resin, it leaves a clear transparent resin of silico-urea.

EXAMPLE III

Silico-formic acid, urea, and an aqueous solution of formaldehyde are mixed in the ratio of equal mols (1:1:1). The pH is adjusted to a pH of 4 to 5 with dilute hydrochloric acid. The mixture is then heated to 70°-90°C, while agitating for 20-30 minutes, or until the desired viscosity is obtained. The resin is first clear, then as the viscosity increases, it becomes white. The resin is soluble in acetic acid and forms a clear solution. When the solution of resin dries, it forms a clear resin.

The formaldehyde silico-urea resin will soften with heat; the softening point varies with the viscosity.

EXAMPLE IV

Thiourea, silico-formic acid, and an aqueous solution of formaldehyde are mixed in the ratio of equal mols. The pH is adjusted to a pH of 4–5 with dilute sulfuric acid. The mixture is then heated to 70°–90°C, while agitating for 20–30 minutes, or until the desired viscosity is obtained. The formaldehyde silico-thiourea resin is white and has a melting point of 40°–50°C, depending on its viscosity.

EXAMPLE V

Silico-formic acid, melamine, and an aqueous solution of formaldehyde are mixed in the ratio of equal mols. The pH is adjusted to a pH of 4–5 with dilute hydrochloric acid. The mixture is then agitated and heated to 70°–100°C for 20–40 minutes or until the desired viscosity is obtained. The formaldehyde silico-melamine resin is white, softens with heat and is soluble in acetic acid. The acetic acid solution of formaldehyde silico-melamine forms a clear resin when dried.

EXAMPLE VI

Silico-formic acid, dicyandiamide and an aqueous solution of formaldehyde are mixed in the ratio of equal mols. The pH is adjusted to a pH of 4–5 with sodium hydrogen sulfate. The above mixture is then agitated and heated to 70°–100°C for 20–40 minutes, or until the desired viscosity is obtained. The resin formed is white, softens with heat, and is soluble in acetic acid. When the solution dries, it leaves a clear resin of formaldehyde silico-dicyandiamide.

EXAMPLE VII

Silico-formic acid and urea are mixed together in the ratio of 1:1 mols. The pH is adjusted to a pH of 4–5 with sodium hydrogen sulfate. Acrolein is added to the above mixture in the ratio of 1 mol to 1 mol of urea. The mixture is then agitated and heated to 50°–80°C for 20–40 minutes, or until the desired viscosity is obtained. A light yellow resin, acrolein silico-urea is produced. The resin is soluble in acetic acid and softens with heat.

EXAMPLE VIII

Silico-formic acid and urea are mixed with crotonaldehyde in the ratio of equal mols. The pH is adjusted to a pH of 4–5 with sodium hydrogen sulfate. The mixture is then agitated and heated to 50°–80°C for 20–40 minutes or until the desired viscosity is obtained. Crotonaldehyde silico-urea resin is light yellow in color, soluble in acetic acid and soften with heat.

What is claimed as new and desired to be protected by Letters Patent is set forth in the appended claims:

1. The process for the production of silico-amino resinous condensation products by the following steps:
   a. mixing silico-formic acid with an amino compound selected from the group consisting of urea, thiourea, melamine, aniline, guanidine, saccharin, propyl urea, butyl urea, benzene and toluene sulfonamides, ammeline, dicyandiamide, aliphatic diamines, other alkyl-substituted ureas and mixtures thereof in a ratio of 0.5 to 2 mols of silico-formic acid to one mol of the amino compound;
   b. adding an aldehyde selected from the group consisting of an aqueous solution of formaldehyde, formaldehyde, acetaldehyde, butyraldehyde, chloral, acrolein, furfural, hexamethylene tetramine and mixtures thereof in a ratio of 1 to 3 mols to one mol of amino compound;
   c. adjusting the pH to a pH of 4 to 5 with an acid catalyst selected from the group consisting of sulfuric acid, hydrochloric acid, formic acid, acetic acid, tartaric acid, oxalic acid, aromatic sulfonic acid, acid salts, acid esters such as acid alkyl phosphates and mixtures thereof;
   d. heating said mixture to 60° to 100°C while agitating for 20 to 40 minutes; thereby
   e. producing a silico-amino resinous condensation product.

2. The method of claim 1 wherein the pH is adjusted in step (c) to a pH of 7.

3. The method of claim 1 wherein the pH is adjusted in step (c) to a pH of 8 to 10 by adding an alkali catalyst instead of an acid catalyst, the alkali catalyst being selected from the group consisting of sodium carbonate, calcium hydroxide, sodium hydroxide, ammonia, alkanolamine and mixtures thereof.

4. The method of claim 1 wherein an alkali catalyst selected from the group consisting of sodium carbonate, calcium hydroxide, sodium hydroxide and mixtures thereof is added to moist silioc-formic acid until the pH is 8 to 10 in step a and mixed with the said amino compound; then the mixture is heated to 135° to 150°C while agitating for 20 to 30 minutes; thereby producing a silico-amino compound.

5. The process for the production of silico-amino compounds and their resinous condensation products by the following steps:
   a. mixing a moist silico-formic acid and an alkali catalyst selected from the group consisting of sodium carbonate, calcium hydroxide, sodium hydroxide, ammonia, alkanolamines and mixtures thereof until the pH is 8 to 10;
   b. adding an amino compound selected from the group consisting of urea, thiourea, melamine, aniline, guanidine, saccharin, propyl urea, butyl urea, benzene and toluene sulfonamides, ammeline, dicyandiamide, aliphatic diamines, other alkyl-substituted ureas and mixtures thereof in a ratio of one mol to 0.5 to 2 mols of silico-formic acid;
   c. heating said mixture to 135° to 150°C while agitating for 20 to 30 minutes; thereby
   d. producing a silico-amino compound;
   e. adding to said silico-amino compound aldehyde selected from the group consisting of an aqueous solution of formaldehyde, formaldehyde, acetaldehyde, butyraldehyde, chloral, acrolein, furfural, hexamethylene tetramine and mixtures thereof in a ratio of 1 to 3 mols to one mol of said amino compound;
   f. heating said mixture to 60° to 100°C while agitating for 20 to 40 minutes; thereby
   g. producing silico-amino resinous products.

6. The method of claim 5 wherein the pH is adjusted in step (d) to a pH of 4 to 5 with an acid catalyst selected from the group consisting of sulfuric acid, hydrochloric acid, formic acid, acetic acid, tartartic acid, oxalic acid, aromatic sulfonic acid, acid salts, acid esters such as acid alkyl phosphates and mixtures thereof.

* * * * *